Dec. 30, 1952  G. E. JAMIESON  2,623,385
TORQUE MEASURING DEVICE
Filed Nov. 6, 1948
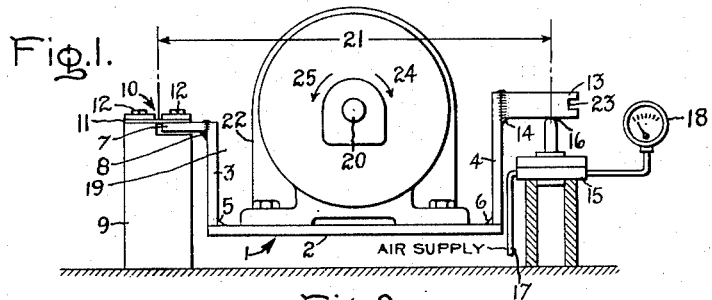
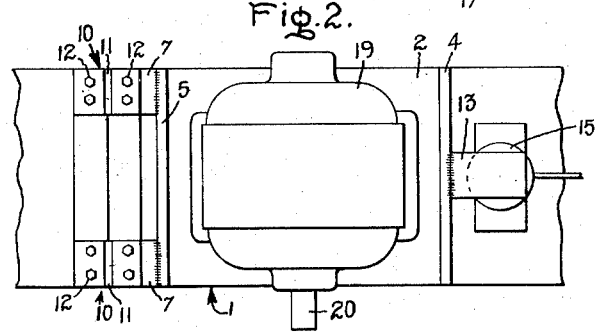
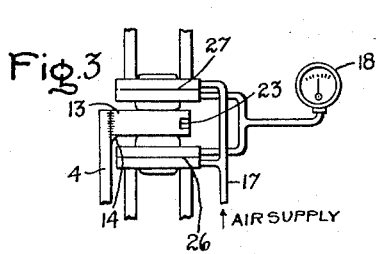
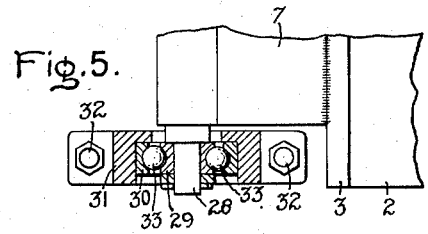
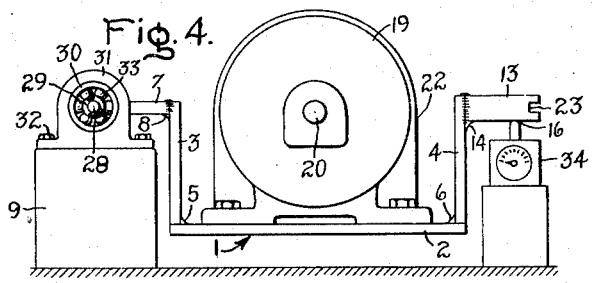
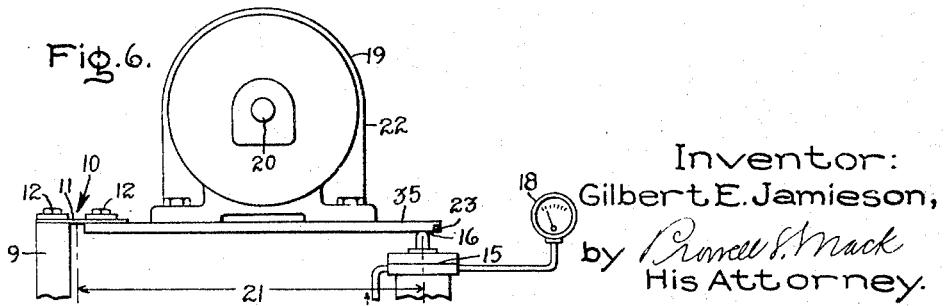
Inventor:
Gilbert E. Jamieson,
by Crowell S. Mack
His Attorney.

Patented Dec. 30, 1952

2,623,385

UNITED STATES PATENT OFFICE 2,623,385

TORQUE MEASURING DEVICE

Gilbert E. Jamieson, Fort Wayne, Ind., assignor to General Electric Company, a corporation of New York Application November 6, 1948, Serial No. 58,697

4 Claims. (Cl. 73—136)

This invention relates to torque measuring devices for rotating machines.

In the testing of rotating machines such as generators, motors, and other rotating sources of mechanical power, it is desirable to provide a simple device for measuring the torque output of the machine. Such a torque measuring device should be so constructed as to permit ready mounting and dismounting thereon of the machine to be tested and it is also desirable to provide for direct reading of the torque output.

An object of this invention is to provide an improved and simplified torque measuring device.

Another object of this invention is to provide an improved direct reading torque measuring device for rotating machines.

Further objects and advantages of this invention will become apparent and the invention will be better understood by reference to the following description and the accompanying drawing. The features of novelty which characterize this invention will be pointed out with particularity in the claims annexed to and forming a part of this specification.

In accordance with this invention, there is provided a torque measuring device for rotating machines having a base member adapted to have the machine to be tested mounted thereon. The base member is supported at one end by two hinges and at the other end by a force measuring device such as a pressure cell. The axis of the hinges is parallel with the axis of the shaft of the test machine, and the two hinges and the pressure cell form a three point support for the base member. When a load is placed on the test machine, the reaction torque exerted on its stationary member is transferred to the base member which tends to rotate about the hinged points of suspension exerting a force on the pressure cell. Thus, the pressure cell can be calibrated in terms of torque as determined by the length of the lever arm from the hinges to the point of engagement of the pressure cell with the base member.

Referring now to the drawing, Fig. 1 is a side elevational view of the improved torque measuring device of this invention; Fig. 2 is a vertical view of the device of Fig. 1; Fig. 3 shows the use of a double-acting pressure cell instead of the single-acting pressure cell of Figs. 1 and 2; Fig. 4 shows the use of an anti-friction bearing hinge instead of the strip hinges of Figs. 1 and 2; Fig. 5 is a vertical view, partly in section, of the hinge mechanism of Fig. 4; and Fig. 6 is a side elevational view of a modification of this improved torque measuring device.

Referring now to Figs. 1 and 2, there is shown a U-shaped base member or cradle 1 which may be conveniently formed of fabricated steel with a lower portion 2, and leg portions 3 and 4 joined together by welds at 5 and 6. The leg 3 is provided with two projections 7 at its outer edge secured by welds 8. The projections 7 of the base member 1 are supported by a stationary supporting member 9 through strip hinges 10 which comprise a thin flexible strip of metal 11 secured to the supporting member 9 and the projections 7 in any suitable manner, as by bolts 12. The leg 4 of the base member 1 has a projection 13 at its outer edge secured by a weld 14. The projection 13 is supported by a suitable force measuring device such as a pressure cell 15 which engages the lower edge of the projection 13 as at 16. A supply of air is provided for the pressure cell 15 from a line 17 and the force exerted on the pressure cell 15 is measured in any suitable manner, as by a manometer or gauge 18. The test dynamoelectric machine 19 is mounted on the lower portion 2 of the base member 1 so that the axis of the shaft 20 is at right angles to the axis of the hinges 10 and the pressure cell 15. It will now be seen that the base member 1 or cradle is supported at three points, namely the two strip hinges 10 on one side and the pressure cell 15 on the other side.

Here, the dimension 21 between the hinges 10 and the point of support 16 becomes a phantom lever arm. When a load is placed on the machine, the reaction torque exerted on the stationary member 22 is transferred to the base member 1 which tends to rotate the base member about the hinges 10 exerting a force on the pressure cell 15. The indicator 18 can be calibrated to read torque directly since the torque of the machine is the force exerted on the pressure cell times the dimension 21. Furthermore, the dimension 21 can be varied to provide a convenient constant in the horsepower formula. A slot 23 may be provided at the end of the projection 13 for use in calibrating the indicator 18 to adjust the dead weight of the test motor 19 to a suitable value.

If a test generator is rotating in the direction shown by the arrow 24, or a test motor is rotating in the direction shown by the arrow 25, a single acting pressure cell, as shown in Fig. 1, is satisfactory since the force exerted on the pressure cell will always be in the downward direction. However, if the direction of rotation is as shown by the arrow 25 for a generator, or arrow 24 for a motor, the force will be in the upper direction and in the event that the upward force exceeds a certain percentage of the dead weight of the machine, determined by the position of the center line of the shaft 20 with respect to the hinges 10 and the point of contact 16, a double acting pressure cell must be utilized as shown in Fig. 3. Here, the projection 13 is engaged by two pressure cells 26 and 27 which are fed by the common air supply line 17 and which are connected to the indicator 18. With this double acting pressure cell arrangement, the torque measuring device of Fig. 1 can be utilized with motors or generators operating in either direction of rotation.

In the event that the total movement of the projection 13 is greater than approximately .010 inch, it will be found desirable to use antifriction bearing hinges as shown in Figs. 4 and 5, rather than strip hinges as shown in Figs. 1 and 2. Here, the projections 7 are formed with a projection 28 to which an inner bearing race 29 is secured. An outer bearing race 30 is positioned in a mounting member 31 which is in turn secured to the stationary supporting member 9 in any suitable manner, as by bolts 32. A plurality of balls 33 are interposed between the inner race 29 and the outer race 30. Furthermore, if the total movement of the projection 13 is to be more than approximately .010 inch, it may also be desirable to use a different type of force measuring device, such as an automatic scale as shown at 34, rather than a pressure cell.

Referring now to Fig. 6, there is shown a modification of this improved torque measuring device wherein there is provided a straight base member 35 rather than the U-shaped base member 1 of Fig. 1. Here, the test machine 19 may be mounted above the base member 35, as shown, or below the base member 35. As in the embodiment of Fig. 1, the dimension 21 between the hinges 10 and the point of support 16 is a phantom lever arm and the indicator 18 can be calibrated to read the torque of the motor directly.

It will now be readily seen that this invention provides an improved and greatly simplified form of torque measuring device wherein a test motor or generator can be readily mounted in and dismounted from the base member and which provides a direct reading of torque. While a dynamo-electric machine is schematically shown in the drawing, it will be readily understood that any other rotating source of mechanical power, or other rotating device requiring power to drive it, can be tested with this device, such as an internal combustion engine, or a pump.

While there are shown and described specific embodiments of this invention, further modifications and improvements will become apparent to those skilled in the art. I desire that it be understood, therefore, that this invention is not to be limited to the particular arrangement disclosed and I intend in the appended claims to cover all modifications which do not depart from the spirit and scope of this invention.

What I claim as new and desire to secure by Letters Patent of the United States is:

1. For use with a rotating machine comprising mechanical or electrical power producing means having a shaft and a relatively stationary member having supporting feet extending below and on either side of said shaft, a torque measuring device comprising an upright U-shaped base means for mounting said feet on the lower portion of said U-shaped base, whereby the U-shaped member absorbs reactive torque from the stationary member of said machine, means hinging one of the upper ends of said U-shaped member to a fixed support about an axis parallel to said shaft at substantially the same height as said shaft and at one side of said machine, and force measuring means supporting the other upper end of said U-shaped member at substantially the same height as said shaft and at the opposite side of said machine.

2. The combination as in claim 1 further characterized by said hinge means comprising a pair of hinges spaced parallel to the axis of said shaft.

3. The combination as in claim 1 further characterized by said hinge means comprising a pair of antifriction bearings spaced parallel to the axis of said shaft.

4. The combination as in claim 1 further characterized by said force measuring means comprising at least one pressure cell adapted to support the associated end of said U-shaped base member.

GILBERT E. JAMIESON.

REFERENCES CITED

The following references are of record in the file of this patent:

UNITED STATES PATENTS

| Number | Name | Date |
|---|---|---|
| 302,976 | Brackett | Aug. 5, 1884 |
| 1,000,494 | Clement | Aug. 15, 1911 |
| 1,541,083 | Walker | June 9, 1925 |
| 2,398,361 | Hagg et al. | Nov. 20, 1945 |

FOREIGN PATENTS

| Number | Country | Date |
|---|---|---|
| 82,453 | Switzerland | Oct. 1, 1919 |
| 763,166 | France | Feb. 5, 1934 |
| 145,371 | Austria | Apr. 25, 1936 |